Figure 1:
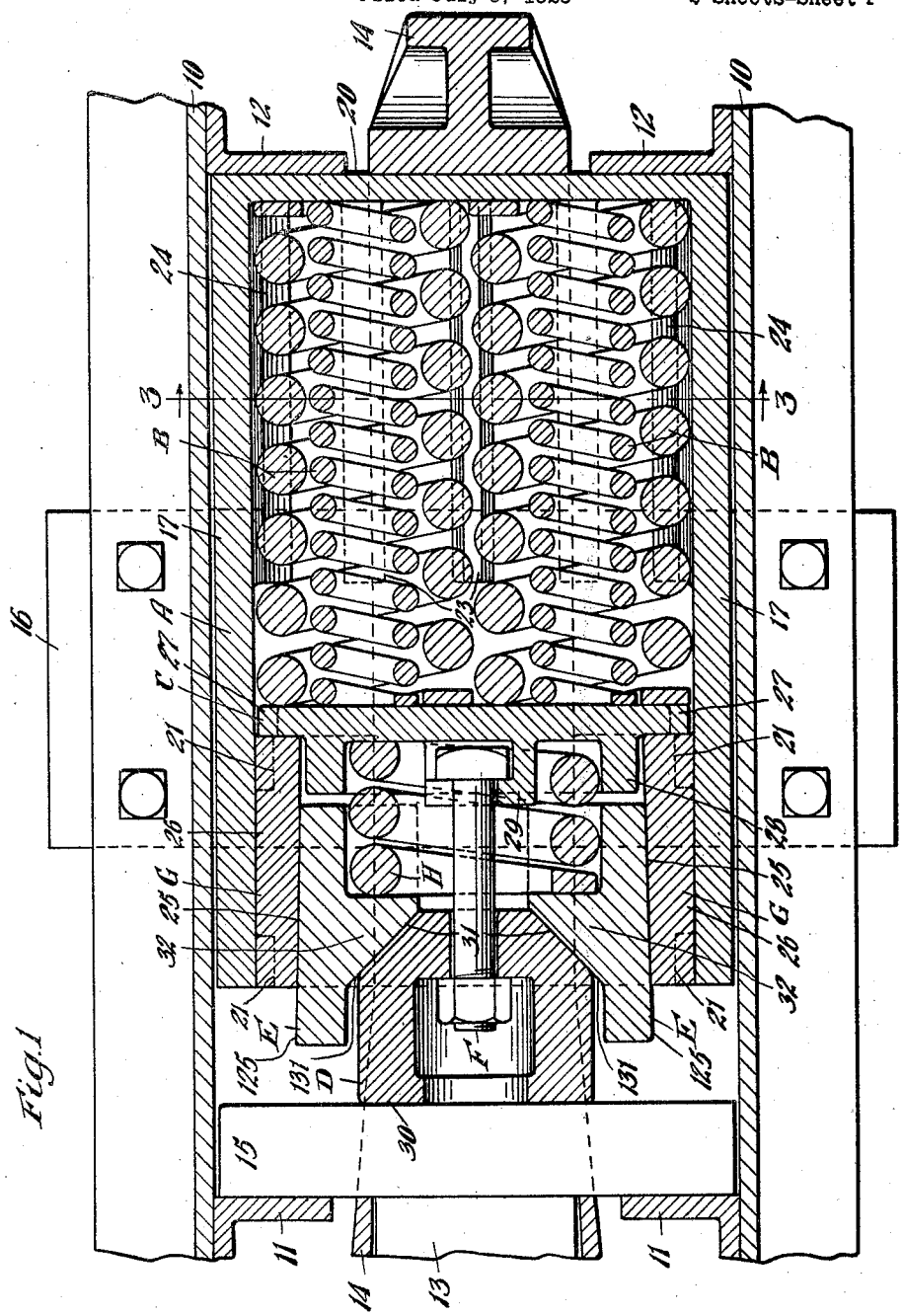

March 15, 1927.

J. F. O'CONNOR 1,620,681

FRICTION SHOCK ABSORBING MECHANISM

Filed July 8, 1925　　2 Sheets-Sheet 1

Witness
Wm. Geiger

Inventor
John F. O'Connor
By George I. Haight
His Atty.

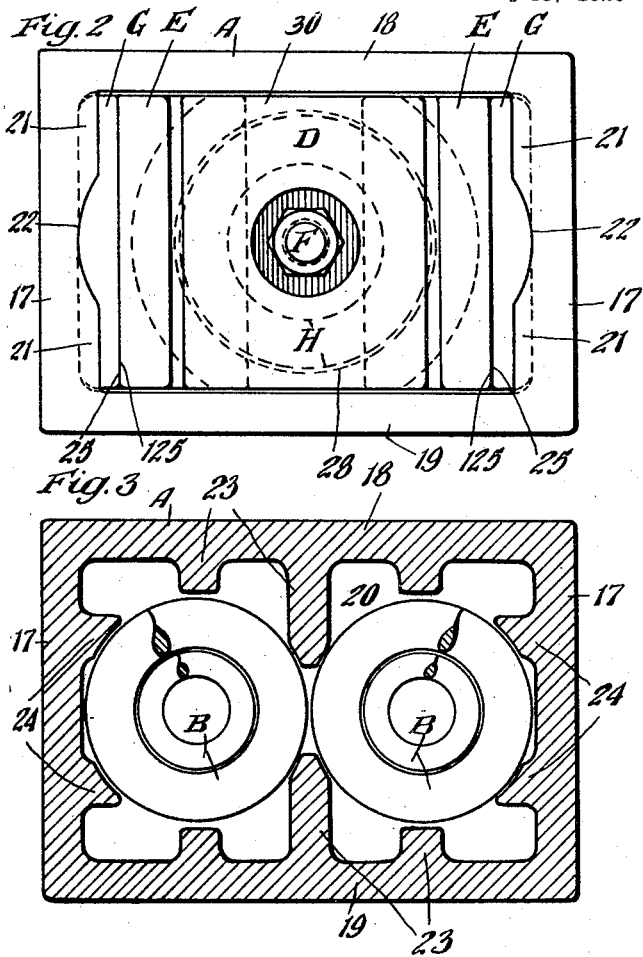

Patented Mar. 15, 1927.

1,620,681

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 18, 1925. Serial No. 44,419.

This invention relates to improvements in friction shock absorbing mechanisms.

One object of the invention is to provide a friction shock absorbing mechanism especially adapted for railway draft riggings, having high capacity and great column strength.

Another object of the invention is to provide a mechanism of the character indicated, including a spring cage casting and friction shell having a friction wedge system cooperating therewith, wherein the spring cage casting has a spring space of maximum size to accommodate twin arranged springs and is so designed as to provide a column-load-sustaining member of exceptionally great strength.

Still another object of the invention is to provide a friction shock absorbing mechanism including a spring cage having a friction shell at one end thereof of smaller cross-sectional area than the cage, so designed that all of the component parts of the mechanism including the twin arranged springs and spring follower, are adapted to be assembled with the spring cage by insertion through the front end of the cage, whereby the side walls of the cage are left intact to strengthen the same and provide a column-load-sustaining member of more sturdy and rugged design than has heretofore been possible in gears of this type, it being the general practice to provide openings in the side walls of the cage, to facilitate insertion of the surface.

Other objects and advantages of the invention will more clearly appear from the description and claims hereinafter following.

In the drawings forming a part of this specification, Figure 1 is a horizontal, longitudinal sectional view of a portion of a railway draft rigging showing my improvements in connection therewith. Figure 2 is a front end elevational view of the shock absorbing mechanism proper. And Figure 3 is a vertical, transverse, sectional view of the shock absorbing mechanism corresponding substantially to the line 3—3 of Figure 1.

In said drawings, 10—10 denote the usual channel shaped draft or center sills of a railway car underframe to the inner faces of which are secured front stop lugs 11—11 and rear stop lugs 12—12. A portion of the draw bar is indicated at 13, the same being operatively connected with a hooded cast yoke 14 of well known form. The shock absorbing mechanism proper, as well as a front main follower 15 are disposed within the yoke. The yoke and the parts therewithin are supported in operative position by a detachable saddle plate 16.

The improved shock absorbing mechanism proper, as shown, comprises, broadly, a combined friction shell and spring cage A; twin arranged main springs B—B; a spring follower C; a pressure-receiving and transmitting wedge D; a pair of friction shoes E—E; a retainer bolt F; a pair of liners G—G; and an auxiliary spring H.

The casting A, as shown, is in the form of a rectangular casing open at its front end and having vertically disposed spaced side walls 17—17, horizontally disposed spaced top and bottom walls 18 and 19, and a transverse end wall 20. The end wall 20 cooperates with the rear stop lugs 12 in the manner of the usual rear follower. At the forward end, the side walls of the casing are provided with spaced, vertically disposed ribs 21—21, the ribs being arranged in pairs at opposite sides of the mechanism. One of the ribs 21 of each pair is arranged at the extreme outer end of the casing, while the other is spaced inwardly therefrom. Each of the ribs 21 is centrally cut away as indicated at 22 for a purpose hereinafter described.

The top and bottom walls 18 and 19 are reinforced by longitudinally disposed ribs 23—23, and the side walls are reinforced by longitudinally disposed ribs 24—24. As most clearly shown in Figure 1, the ribs extend from the rear wall 20 to approximately the center of the casing.

The twin arranged main springs B comprise two longitudinally disposed units at opposite sides of the mechanism. Each unit comprises a relatively light inner coil and a relatively heavier outer coil. The two units of the spring resistance B are held in proper position by the re-inforcing ribs 23 and 24 of the casing, the ribs being cut away at their inner sides to correspond with the outer contour of the corresponding outer coil of the unit. As most clearly shown in Figure 3, the ribs 23 associated with the top and bottom walls respectively of the casing are three in number, and the central rib of each set is appreciably wider than the two outer ribs, the central ribs 23 of the top and bottom walls projecting between the two spring units as shown in Figure 3.

The liners G are in the form of relatively heavy plates each having an inner flat friction surface 25, slightly inclined with reference to the longitudinal axis of the mechanism. Each plate G is cut away at the opposite ends to provide a central enlargement 26 on the outer side thereof adapted to be accommodated between the corresponding ribs 21 of the casing to hold the liners against longitudinal movement with reference to the casing. When the mechanism is assembled, with the liners G in position, the liners, together with the top and bottom walls of the casing, form a friction shell. The casing rearwardly of the friction shell forms a spring cage. As most clearly shown in Figure 1, the friction surfaces 25 of the liners G converge inwardly of the mechanism.

The spring follower C is in the form of a substantially rectangular plate, the main body portion of the same being of a width slightly less than the distance between the opposed ribs 21 of the casing. At opposite sides, the follower C is provided with projections 27 corresponding in outline to the cut-away portions 22 of the ribs 21. At the forward side, the spring follower C has an annular flange 28 adapted to co-operate with the inner ends of the friction-shoes E to limit their movement with reference to the spring follower. On its front side, the follower C is also provided with an overhanging slotted flange 29, beneath which is adapted to be engaged the head of the retainer bolt F.

The pressure-receiving and transmitting wedge D is in the form of a cored block having a flat, transverse face 30 at the forward end thereof, adapted to bear on the inner surface of the follower 15. At the inner end, the block D has a pair of inwardly converging wedge faces 31 disposed on opposite sides of the axis of the mechanism.

The friction shoes E—E are of like design, each being provided with a longitudinally disposed outer flat friction surface 125 adapted to co-operate with the corresponding friction surface 25 of one of the liners G. On the inner side, each shoe E has a lateral enlargement 32 provided with an outer wedge face 131 correspondingly inclined to one of the wedge faces 31 of the block D and co-operating therewith. The inner ends of the friction shoes E are normally slightly spaced from the outer ends of the flange 28 of the spring follower C as most clearly illustrated in Figure 1.

The auxiliary spring H, which comprises a relatively heavy short coil, is interposed between the main body portion of the spring follower C and the inner ends of the enlargements 32 of the friction shoes E.

The retainer bolt F has its opposite ends anchored respectively to the spring follower C and the wedge block D, the head of the bolt being accommodated within the opening of the block. The bolt F holds the parts assembled and maintains the mechanism of overall uniform length. In the normal full release position of the parts, the spring follower C is limited in its outward movement by engagement with the inner ends of the liners G. The parts are so arranged that the main springs B are normally held under initial compression. Compensation for wear of the various friction and wedge faces is taken care of by the auxiliary spring H, which is under initial compression and maintains the friction faces of the shoes in intimate contact with the corresponding friction surfaces of the shell and wedge faces of the block D.

In assembling the mechanism, the main springs B are first inserted within the shell from the forward end thereof, the cutaway portions 22 of the ribs 21 being on a curve which is of slightly greater radius than the outer coils of the spring units to provide proper clearance for the same. The spring follower C is next placed within the shell by inserting the same through the forward end thereof, the cut-away portions of the ribs providing clearance for the enlargements 27. The spring B, being of surplus length, these parts noted, are forced inward in a press and spring follower forced below flanges 21, and then the liners G are next placed in position with the enlargements 26 thereof disposed between the ribs 21 of the casing. The wedge-friction-shoes, main wedge D and auxiliary spring H are then assembled with the mechanism and secured by the retainer bolt F.

It will be evident by so proportioning and arranging the parts that all the co-operating elements of the mechanism may be assembled with the casing by inserting the same from the forward end thereof, the side walls of the casing are left intact, thereby providing a solid closed casing of unusual column strength, the ribs 23 and 24 on the interior of the casing adding materially to the reinforcement of the same.

The operation of my improved shock absorbing mechanism is as follows, assuming an inward or compression stroke. As the pressure is transmitted through the wedge D to the friction shoes E, the latter will be forced inwardly of the friction shell and spread apart and placed in intimate contact with the friction surfaces 25. During the initial action, the auxiliary spring H will be compressed. This action will continue until the inner ends of the friction shoes come into contact with the flange 28 of the spring follower, whereupon the spring follower will be carried inwardly in unison with the friction-shoes and main wedge compressing the twin arranged main springs B. The described action will continue either until the actuating force is reduced, or the mechanism is fully compressed, whereupon the main follower will engage the outer end of the casing A, and the force transmitted directly through the casing A to the corresponding stop lugs on the draft sills. Upon reduction of the actuating pressure, the springs B and H will restore all of the parts to normal position, outward movement of the wedge D being limited by the retaining bolt F and movement of the latter being in turn limited by the spring follower C coming into abutment with the inner ends of the liners G.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a spring cage casting open at one end only and of substantially uniform interior cross sectional area, said cage having means attached thereto at said open end presenting opposed friction surfaces and restricting the cross sectional area of said cage, said cage having retaining means thereon for said first named means; of twin arranged main springs within the shell; a spring follower; and a wedge-friction system co-operating with the shell, the retaining means of said cage being so formed as to permit free insertion of the springs and spring follower through the open end of the cage.

2. In a friction shock absorbing mechanism, the combination with a substantially rectangular casing, said casing being open at one end only; of twin arranged springs within the casing; a spring follower within the casing; a pair of opposed liners at the open end of said casing, said liners defining a friction shell of less width than the casing and the casing rearwardly of said shell forming a spring cage; co-acting retaining means on said casing and liners for holding the latter in fixed position in said casing, said retaining means on the casing being cut away to provide clearance to permit free insertion of the springs and spring follower through the open end thereof; and a friction wedge-system co-operating with the friction shell.

3. In a friction shock absorbing mechanism, the combination with a spring cage; open at one end only; of twin arranged coil spring units within the spring cage, said spring units being disposed in transverse alinement, the combined external diameters of said twin units approximating the width of the cage; a spring follower within the cage; a pair of opposed elements forming the side walls of a friction shell, the shell defined by said elements being of less width than the spring follower, said elements acting as abutments to limit the outward movement of the spring follower; ribs on said cage for preventing movement of said elements longitudinally of same, said ribs being cut away to permit free insertion of the spring follower and spring units into the cage; friction shoes co-operating with said elements; and a pressure transmitting element co-operating with the shoes.

4. In a friction shock absorbing mechanism, the combination with a rectangular casing forming a combined spring cage and rectangular friction shell, said shell being defined by the top and bottom walls of the casing and a pair of detachable liners within the casing; means for anchoring the liners to the side walls of the casing, the width of said friction shell being less than the width of the spring cage, said casing being open at the friction shell end thereof only; of twin arranged main springs within the cage; a spring follower within the cage, said spring follower being of greater width than the friction shell and adapted to have the outward movement limited by engagement with said liners, said anchoring means being formed to permit free insertion of the spring follower and springs through the open end of the casing upon removal of said liners; friction-shoes within the friction shell; and a main wedge-co-operating with the shoes.

5. In a friction shock absorbing mechanism, the combination with a rectangular casing open at one end; of a pair of opposed liners within the casing at the open end thereof, said liners presenting opposed, inwardly converging friction surfaces; ribs on the casing for preventing longitudinal movement of the liners, the top and bottom walls of said casing, and the inner surfaces of said liners defining a friction shell, and the casing rearwardly of said shell defining a spring cage, said shell being of less width than the spring cage; a spring resistance within said cage; a spring follower within the cage, said spring follower being of greater width than the friction shell and said ribs being cut away to permit insertion of the spring follower and spring resistance through the open end of the casing; friction-shoes within the friction shell; a wedge co-operating with the shoes; and an auxiliary spring resistance interposed between the friction shoes and spring follower.

6. As an article of manufacture, a combined friction shell and spring cage including, a rectangular casing open at one end only and having opposed detachable interior liners at the open end thereof, said liners, together with the top and bottom walls of the casing defining a friction shell and the casing rearwardly of said shell forming a spring cage adapted to accommodate twin springs, said casing having ribs at the forward end thereof adapted to retain said liners in position, said ribs being depressed between the ends thereof to provide clearance for insertion of the twin springs through the open end of the casing.

In witness that I claim the foregoing I have hereunto subscribed my name this 15th day of July, 1925.

JOHN F. O'CONNOR.